US011942686B2

(12) United States Patent
Taylor

(10) Patent No.: US 11,942,686 B2
(45) Date of Patent: Mar. 26, 2024

(54) ANTENNA SHIELDING IN A CAPACITANCE MODULE

(71) Applicant: Cirque Corporation, Sandy, UT (US)

(72) Inventor: David Taylor, West Jordan, UT (US)

(73) Assignee: Cirque Corporation, Sandy, UT (US)

( * ) Notice: Subject to any disclaimer, the term of this patent is extended or adjusted under 35 U.S.C. 154(b) by 113 days.

(21) Appl. No.: 17/873,613

(22) Filed: Jul. 26, 2022

(65) Prior Publication Data

US 2024/0039150 A1 Feb. 1, 2024

(51) Int. Cl.
*H01Q 1/52* (2006.01)

(52) U.S. Cl.
CPC .................................. *H01Q 1/526* (2013.01)

(58) Field of Classification Search
None
See application file for complete search history.

(56) References Cited

U.S. PATENT DOCUMENTS

| | | | | |
|---|---|---|---|---|
| 5,856,822 | A | 1/1999 | Du | |
| 6,188,391 | B1 | 2/2001 | Seely | |
| 6,380,930 | B1 | 4/2002 | Van Ruymbeke | |
| 8,743,083 | B2 | 6/2014 | Zanone | |
| 8,933,901 | B2 | 1/2015 | Paulsen | |
| 8,988,628 | B2 | 3/2015 | Martisauskas | |
| 9,178,267 | B2 | 11/2015 | Yeh | |
| 9,223,352 | B2 | 12/2015 | Smith | |
| 9,323,399 | B2 | 4/2016 | Osoinach | |
| 10,438,425 | B2 | 10/2019 | McLeod | |
| 10,606,323 | B1 | 3/2020 | Chang | |
| 10,877,616 | B2 | 12/2020 | Liu | |
| 10,924,856 | B2 | 2/2021 | Liu | |
| 2011/0169770 | A1* | 7/2011 | Mishina | G06F 3/0446 345/174 |
| 2011/0273382 | A1 | 11/2011 | Yoo | |
| 2012/0034888 | A1 | 2/2012 | De Flaviis | |
| 2012/0133597 | A1 | 5/2012 | Chen | |
| 2012/0146857 | A1 | 6/2012 | Wang | |
| 2013/0162594 | A1* | 6/2013 | Paulsen | H01Q 1/22 345/173 |
| 2013/0285797 | A1 | 10/2013 | Paulsen | |
| 2014/0111474 | A1 | 4/2014 | Bytheway | |
| 2014/0253830 | A1 | 9/2014 | Li | |
| 2016/0124574 | A1 | 5/2016 | Rouaissia | |
| 2018/0032166 | A1 | 2/2018 | Orihara | |
| 2019/0148988 | A1 | 5/2019 | Hwang | |

* cited by examiner

*Primary Examiner* — Dimary S Lopez Cruz
*Assistant Examiner* — Aladdin Abdulbaki

(57) ABSTRACT

An apparatus may include a substrate including a capacitance sensing electrode, an antenna on the substrate, and a shield feature between the electrodes and the antenna.

18 Claims, 14 Drawing Sheets

1612

1712

ANTENNA SHIELDING IN A CAPACITANCE MODULE

FIELD OF THE DISCLOSURE

This disclosure relates generally to systems and methods for capacitance modules, such as a touch pad. In particular, this disclosure relates to systems and methods for enabling radio frequencies to transmit and receive at the touch pad.

BACKGROUND

Touch pads are often included on processor-based devices, such as laptop computers or the like, in order to allow a user to use fingers, styli, or the like as a source of input and selection. Additionally, processor-based devices often include radio frequency (e.g., 3 MHz-30 GHz) transmitters, receivers, transceivers, or the like (collectively, "transceivers" herein) for Wi-Fi, Bluetooth, near field communications (NFC), or the like. However, capacitive touch pads often require electrical shielding to prevent noise from the processor-based device from interfering with normal touch pad functions. When in proximity to the radio transceiver, that shielding may prevent transmission and reception of the radio frequencies.

For example, the opening in the chassis for a touchpad of a processor-based device (such as a laptop) may be in the only opening in the chassis, which allow sending and receiving Wi-Fi or NFC communications. Existing devices may place the radio frequency antenna near (e.g., adjacent) the touch pad to allow some of the radio frequencies through the shielding. However, this approach often requires tuning the antenna, which is often difficult. Further, the antenna system may use more power to transmit the signal around the components of the touchpad and the performance of the touch pad may be affected. Additionally, the above-described system may be more difficult to manufacture due to variations in the touch pad printed circuit board (PCB) affecting the antenna resonance. Other drawbacks, inconveniences, and issues with existing devices and methods also exist.

SUMMARY

In one embodiment, an apparatus may include a stack of layers, including a capacitive sensor layer in the stack of layers, a set of electrodes on the capacitive layer, an antenna on the capacitive layer, and a shield feature between at least a portion of the set of electrodes and the antenna.

The shield feature may include a ground ring.

The shield feature may include multiple sections.

The multiple sections may be electrically independent.

The multiple sections may be connected.

The antenna may surround the set of electrodes on the capacitive layer.

A portion of the shield feature may be ungrounded.

A portion of the shield feature may be grounded.

The shield feature may not overlap with any portion of the set of electrodes.

The shield feature may overlap with a portion of the set of electrodes.

The electrodes in the set of electrodes may be routed through a via in the capacitive sensor layer wherever the electrodes and ground ring would overlap.

The shield feature may surround the set of electrodes.

The shield feature may surround the antenna.

The apparatus may be a touch screen.

The stack of layers may include a first capacitive sensor layer and a second capacitive sensor layer, with the antenna formed on at least one of the capacitive sensor layers.

The shield feature may be formed on both the first capacitive sensor layer and the second capacitive sensor layer.

The first set of electrodes may be formed on a first surface of the capacitive sensor layer and a second set of electrodes may be formed on a second surface of the capacitive sensor layer.

The stack of layers may include a component layer containing a deposit of grounding material which grounds at least a portion of the shield feature.

The antenna may be configured to transmit a wireless signal according to a Wi-Fi protocol, short-range wireless protocol, Near Field Communication (NFC) protocol, or Zigbee protocol.

The shield feature may include at least a section that is electrically conductive.

The shield feature may include at least a section that is magnetically conductive.

The shield feature may include at least a section that is magnetically conductive and electrically insulating.

The shield feature may include a ferrite material.

In one embodiment, an apparatus may include a substrate including a set of electrodes, an antenna on the substrate, and a shield feature on the substrate between the set of electrodes and the antenna.

In one embodiment, an apparatus may include a substrate including a capacitance sensing electrode, an antenna on the substrate, and a shield feature between the electrodes and the antenna.

DETAILED DESCRIPTION OF THE INVENTION

Figure 1:
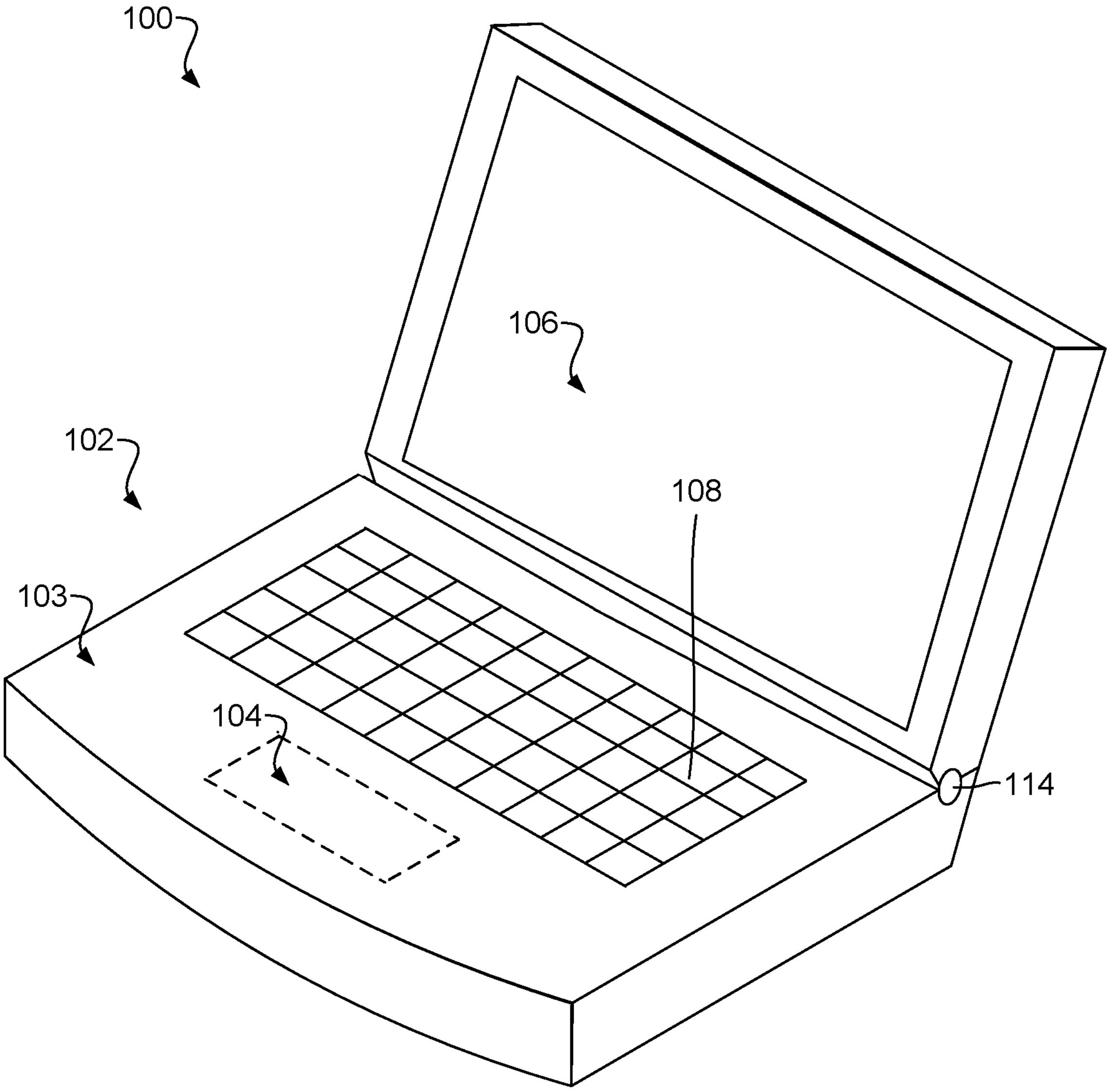
FIG. 1 depicts an example of an electronic device in accordance with the present disclosure.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
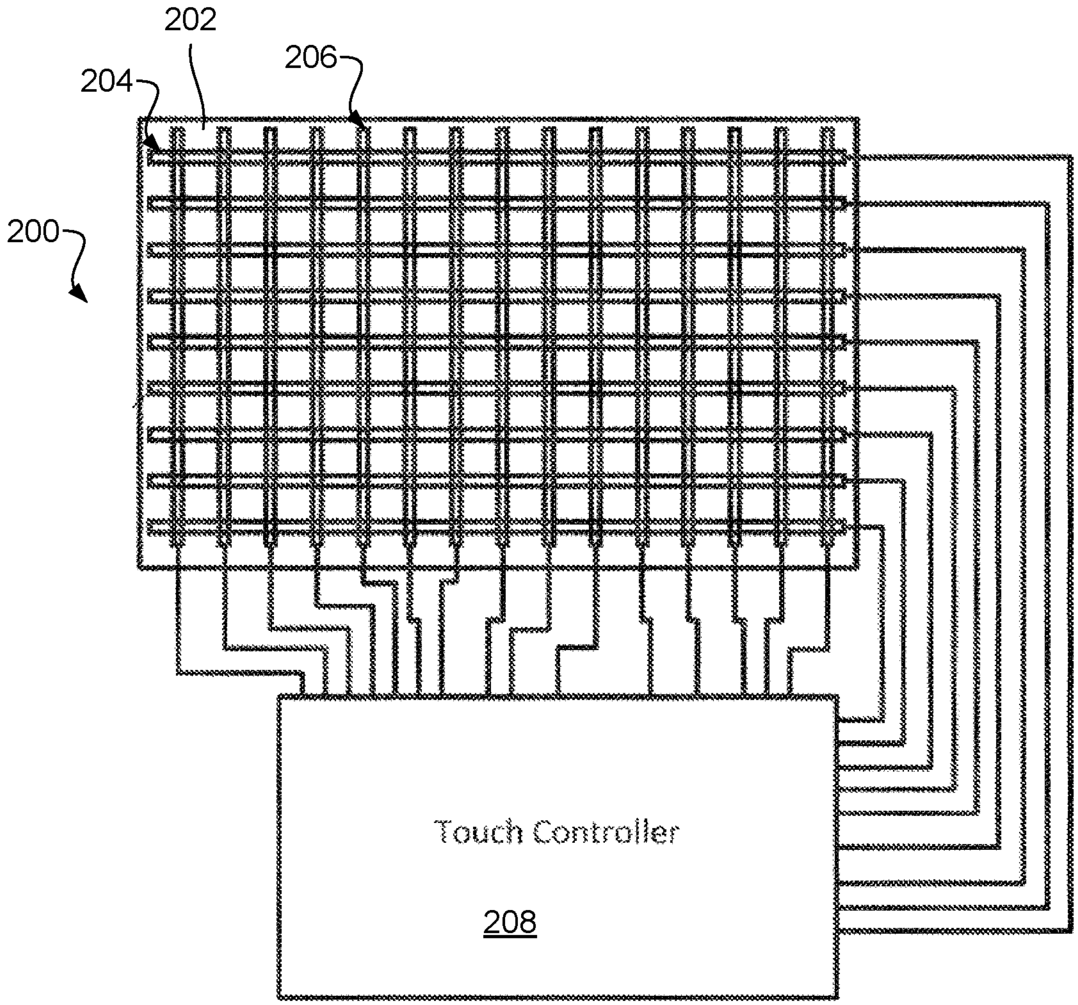
FIG. 2 depicts an example of a substrate with a first set of electrodes and a second set of electrodes in accordance with the present disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
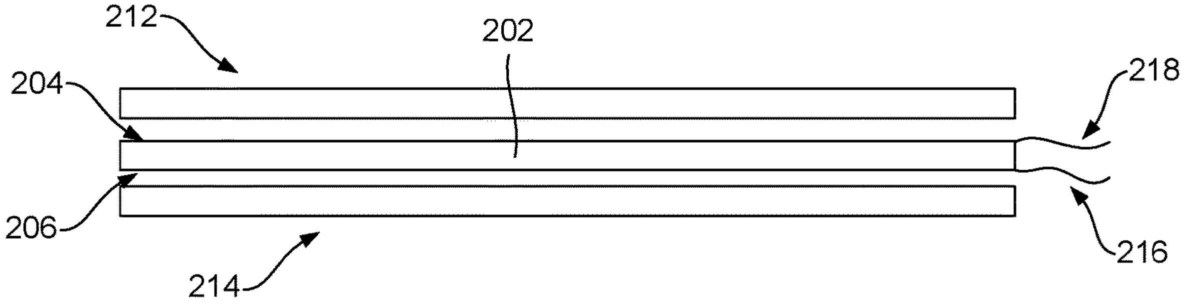
FIG. 3 depicts an example of a touch pad in accordance with the present disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
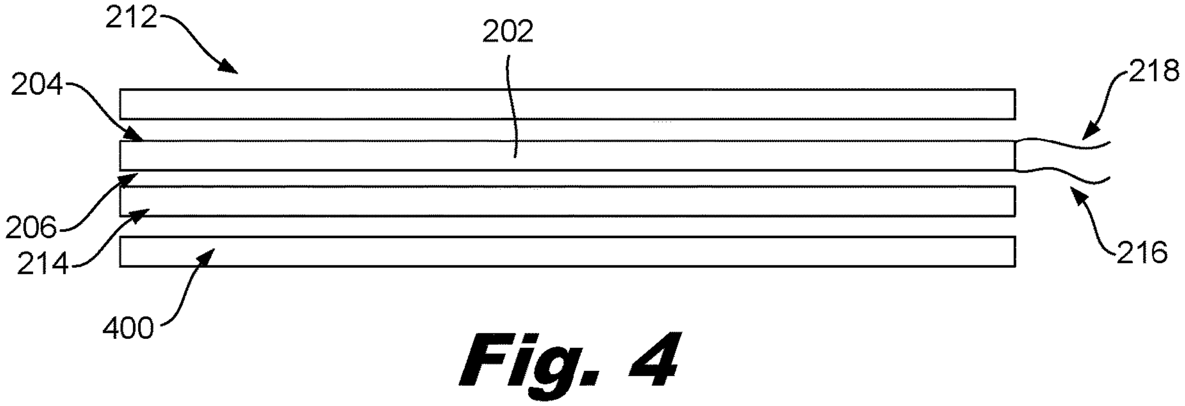
FIG. 4 depicts an example of a touch screen in accordance with the present disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5A:
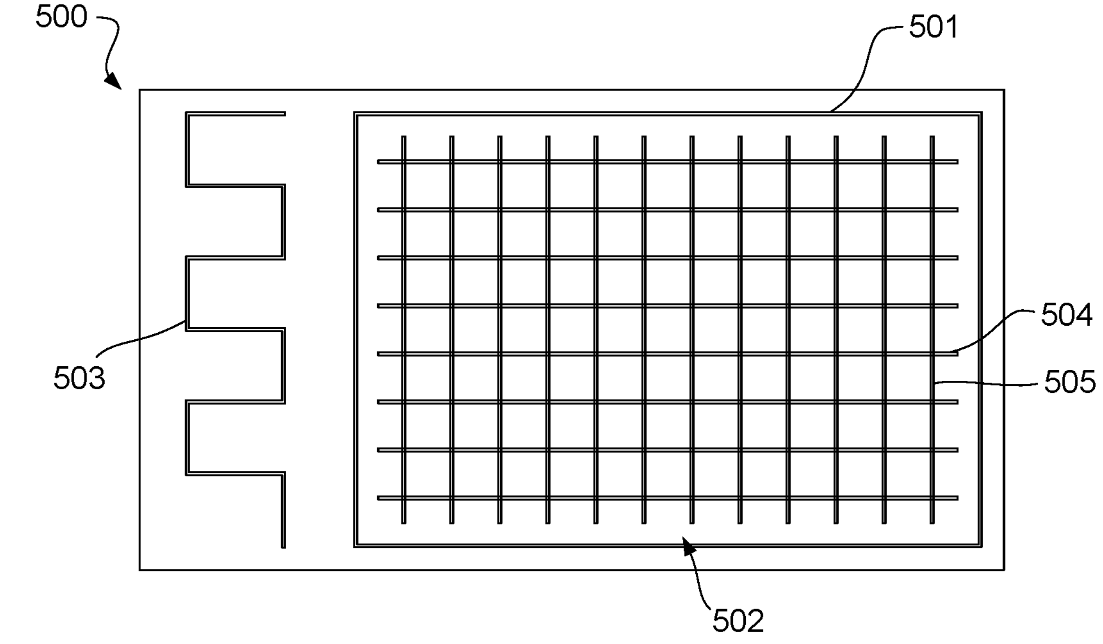
FIG. 5*a* depicts an example of a sensor layer in accordance with the present disclosure.

FIG. 5*a* depicts an example of a sensor layer 500 in accordance with the present disclosure. In this example, the sensor layer 500 contains a capacitance sensor 502, a shield feature 501, and an antenna 503.

The capacitance sensor 502 contains a first set 504 of electrodes and a second set 505 of electrodes, which cross each other. The electrodes of the first set 504 of electrodes may be sense electrodes, transmit electrodes, or another type of electrodes. The electrodes of the second set 505 of electrodes may be sense electrodes, transmit electrodes, or another type of electrodes. The electrodes of the first set 504 and second set 505 of electrodes may be printed, etched, or otherwise formed on the sensor layer 500. Together, the first set 504 and second set 505 of electrodes may form a mutual capacitance sensor.

This example depicts the capacitance sensor 502 as a mutual capacitance sensor that has two sets of electrodes. In other examples, a capacitance sensor may be a self-capacitance sensor, utilizing only a single set of electrodes. Therefore, while the capacitance sensor 502 contains two sets of electrodes in this example, a capacitance sensor may include one set of electrodes, two sets of electrodes, three sets of electrodes, a different number of sets of electrodes, or combinations thereof.

When two electrodes are formed on the same layer, one of the electrodes may be routed through the substrate of a layer so that the two electrodes do not come into contact at the junctions where the individual electrodes of the first set 504 and the second 505 cross. In this example, the electrodes from the first set 504 of electrodes may be routed through the substrate of the sensor layer 500 to avoid contact with the electrodes from the second set 505 of electrodes (see FIG. 5*b*).

The sensor layer 502 may contain an antenna 503. The antenna may be used to transmit a wireless signal according to a Wi-Fi protocol, short-range wireless protocol, NFC protocol, or Zigbee protocol. In this example, the antenna 503 has a square wave shape, which may be used to transmit a wireless signal according to a Wi-Fi protocol or short-range wireless protocol. While this example depicts the antenna 503 with a square wave shape, an antenna may have a different shape. For example, an antenna may have a square wave shape, spiral shape, a linear shape, another type of shape, or combinations thereof.

While a single antenna is identified in the sensor layer 500, a sensor layer may include a different number of antennas. In other examples, a sensor layer may include one antenna, two antennas, three antennas, a different number of antennas, or combinations thereof.

In this example, the shield feature 501 surrounds capacitance sensor 502. The shield feature 501 may include a ground ring, which may be made of copper, galvanized steel, another type of grounding material, or a combination thereof. In cases where the shield feature 501 includes a ground ring, the ground ring may be etched, printed, or otherwise formed on the sensor layer 500.

While in this example the shield feature 501 surrounds the capacitance sensor 502, in other examples, a shield feature may be positioned differently on a sensor layer. For example, a shield feature may surround only part of a sensor, or surround an antenna, or surround only part of an antenna, etc.

While the shield feature 501 has a rectangular shape in this example, a shield feature may have many shapes. In other examples, a shield feature may have a spiral shape, a square shape, a rectangular shape, a circular shape, a symmetric shape, an unsymmetric shape, another type of shape, or a combination thereof. While the shield feature 501 is continuous and only includes one section in this example, in other examples, a shield feature may be discontinuous and/or include multiple sections on the surface of the substrate. Shield features that are discontinuous and/or include multiple sections may isolate two electrical elements from each other.

The mutual capacitance sensor formed by the first set 504 and second set 505 of electrodes may be sensitive to electrical interference that may originate from the antenna 503. In some examples, by placing the shield feature 501 between the capacitive sensor 502 and the antenna 503, the capacitive sensor may be electrically isolated from interference from the antenna, and the antenna may be electrically isolated from interference that may originate from the capacitive sensor. Because the shield feature 501 enables the capacitive sensor 502 and antenna 503 to operate without interfering with each other, the capacitive sensor and antenna may be placed on the same layer. Placing the antenna 504 and capacitive sensor 502 on the same layer may presents several advantages, including reducing the size of a capacitance module and reducing material cost.

Figure 5B:
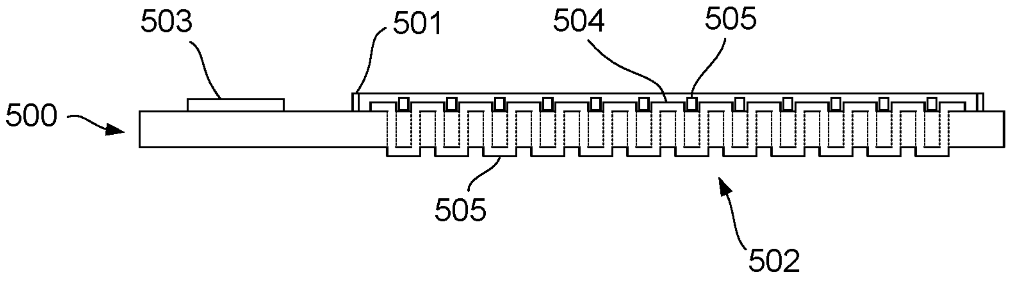
FIG. 5*b* depicts an example of a sensor layer in accordance with the present disclosure.

FIG. 5*b* depicts a cross sectional view of the sensor layer 500 depicted in FIG. 5*a*. The shield feature 501, which surrounds the capacitive sensor 502, extends vertically from the sensor layer 500 further than the electrodes from either the first set 504 or the second set 505 of electrodes extend from the sensor layer 500. The shield feature 501 may also extend vertically from the sensor layer 500 further than the antenna 503 extends from the sensor layer. By extending vertically further from the sensor layer 500, the shield feature 501 may better reduce interference between the capacitance sensor 502 and antenna 503 compared to a shield feature that did not extend as much. In such examples, the vertical height of the shield feature may be greater than at least one electrode of the sensor, the antenna, or combinations thereof. In other examples, the shield feature, antenna, and at least one electrode has the same height. In yet another example, at least one electrode and/or the antenna has a greater height than the shield feature.

The electrodes from the first set 504 of electrodes may be routed through the substrate of the sensor layer 500. By being routed through the substate, the electrodes 504 may avoid physical contact with the electrodes from the second set 505 of electrodes. Routing one set of electrodes through the substrate may prevent two electrodes from touching each other and shorting out.

Figure 6:
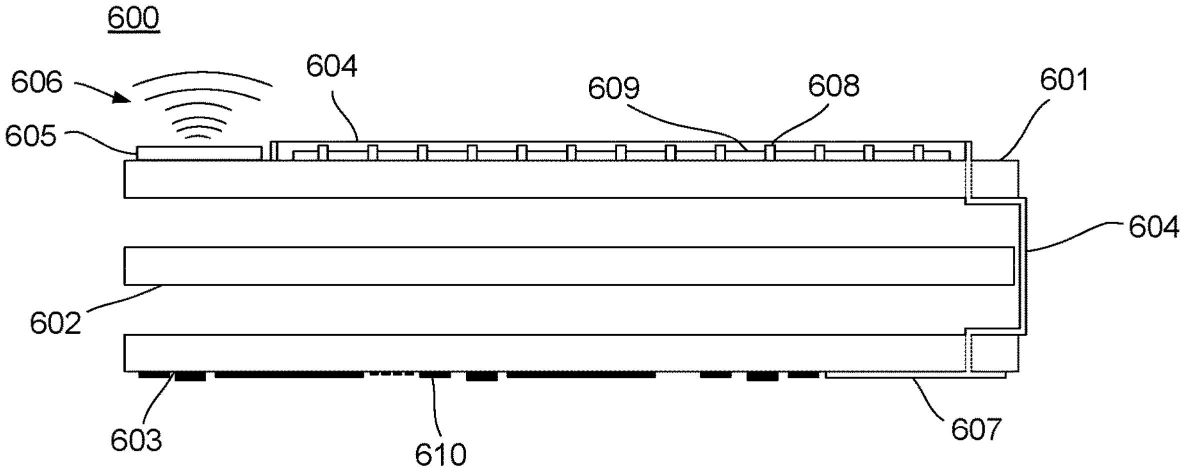
FIG. 6 depicts an example of a stack of layers in accordance with the present disclosure.

FIG. 6 depicts an example of a stack of layers 600 in accordance with the present disclosure. In this example, the stack 600 includes a sensor layer 601, a shield layer 602, and a component layer 603. Although three layers are identified in the stack 600, a stack of layers may include more or less layers. For example, a stack may include two layers, four layers, another number of layers, or combinations thereof. In some examples, the sensor may constructed using multiple layers.

In the depicted example, the sensor layer 601 includes a first set 608 of electrodes and a second set 609 of electrodes. The electrodes of the first and second sets 608, 609 of electrodes may be sense electrodes, transmit electrodes, or another type of electrodes. Together, the first set 608 of electrodes and second set 609 of electrodes may form a mutual capacitance sensor.

The sensor layer 601 includes a shield feature 604. The shield feature 604 is placed between the mutual capacitance sensor formed by the first set 608 and second set 609 of electrodes and the antenna 605. In this example, the shield feature 604 is a ground ring that surrounds the mutual capacitance sensor. In this example, the shield feature 604 is continuous and includes only one section, although in other examples a shield feature may be discontinuous and/or include more than one section. The shield feature 604 may prevent electrical interference between the antenna 605 and the electrodes from the first set 608 and second set 609 of electrodes.

A shield feature may be grounded. In this example, the shield feature 604 is routed through the substrate of the sensor layer 601 and through the substrate of the component layer 603. The shield feature 604 may be connected to a grounding deposit 607 on the component layer 603 which grounds the shield feature. The grounding deposit may be made of copper, gold, iron, another type of grounding material, or a combination thereof. In some examples, the grounding deposit may be constructed to connect to a frame of an electric device, such as a casing of a laptop, a mobile device, electronic tablet, or another type of ground.

The component layer 603 may contain several components 610 that are used to operate the capacitance module. Components may include but are not limited to a central processing unit (CPU), a digital signal processor (DSP), an analog front end (AFE), an amplifier, a peripheral interface controller (PIC), another type of microprocessor, an integrated circuit, a field programmable gate array (FPGA), an application specific integrated circuit (ASIC), a combination of logic gate circuitry, other types of digital or analog electrical components, or combinations thereof.

The stack of layers 600 includes a shield layer 602. The shield layer 602 may be made of a material constructed to block electrical interference, such as copper, aluminum, another appropriate shielding material, or a combination thereof. The shield layer 602 may be positioned adjacent to the sensor layer 601 to shield the electrically sensitive elements on the sensor layer, such as the first set 608 of electrodes, the second set 609 of electrodes, or the antenna 605.

In some examples, the shield feature 604 may pass through or around the sensor layer 601 and the component layer 603, the shield feature 604 and the shield layer 602 may be electrically isolated from each other. To accommodate the shield feature 604, the shield layer 602 is shaped and positioned such that the shield feature may pass by the shield layer without touching it. The shield feature 604 may conduct some voltage from either the antenna 605 or the electrodes from the first set 608 and second set 609 of electrodes. By keeping the shield feature 604 and the shield layer 603 electrically isolated from each other, the shield layer may shield the sensor layer 601 from interference more effectively than if the shield feature and shield layer were connected.

While FIG. 6 depicts an example a sensor layer where two sets of electrodes are formed on one side of the layer, electrodes may be positioned differently in a stack of layers. For instance, in examples where a stack includes two sets of electrodes, a first set of electrodes may be on one side of a sensor layer and a second set may be on another side of the same sensor layer, or a first set of electrodes may be on a first sensor layer while a second set of electrodes is on a second sensor layer in the stack.

Figure 7:
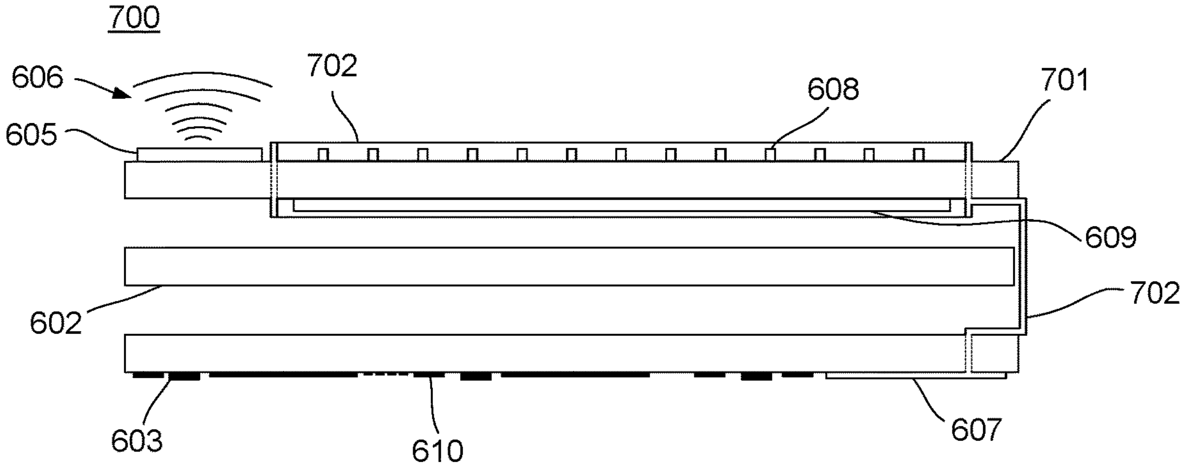
FIG. 7 depicts an example of a stack of layers in accordance with the present disclosure.

FIG. 7 depicts an example of a stack of layers 700 in accordance with the present disclosure. In this example, the stack of layers 700 includes a sensor layer 701, the shield layer 602, and the component layer 603. While three layers are identified in the stack of layers 700, a stack of layers may include a different number of layers. The sensor layer 701 includes the antenna 605, the first set 608 of electrodes, the second set 609 of electrodes and a shield feature 702 between the first set and second set of electrodes.

In this example, the first set 608 of electrodes is formed on a first side of the sensor layer 701 and the second set 609 of electrodes is formed on a second side of the sensor layer. By forming the first set 608 and second set 609 of electrodes on different sides of the same layer, the sets of electrodes are isolated from one another without having to route one of the sets of electrodes through the substrate.

The shield feature 702 surrounds the first set 608 and second set 609 of electrodes and is located between the sets of electrodes and the antenna 605. Because the first set 608 and second set 609 of electrodes are on two sides of the sensor layer 701, the shield feature is also formed on the two sides of the layer. The shield feature 701 is continuous and is routed through the substrate of the sensor layer 701.

The shield feature 701 passes the shield layer 609 and routes through the substrate of the component layer 603 where it connects to the grounding deposit 607. In this example, the grounding deposit 607 grounds the shield feature 702.

Figure 8:
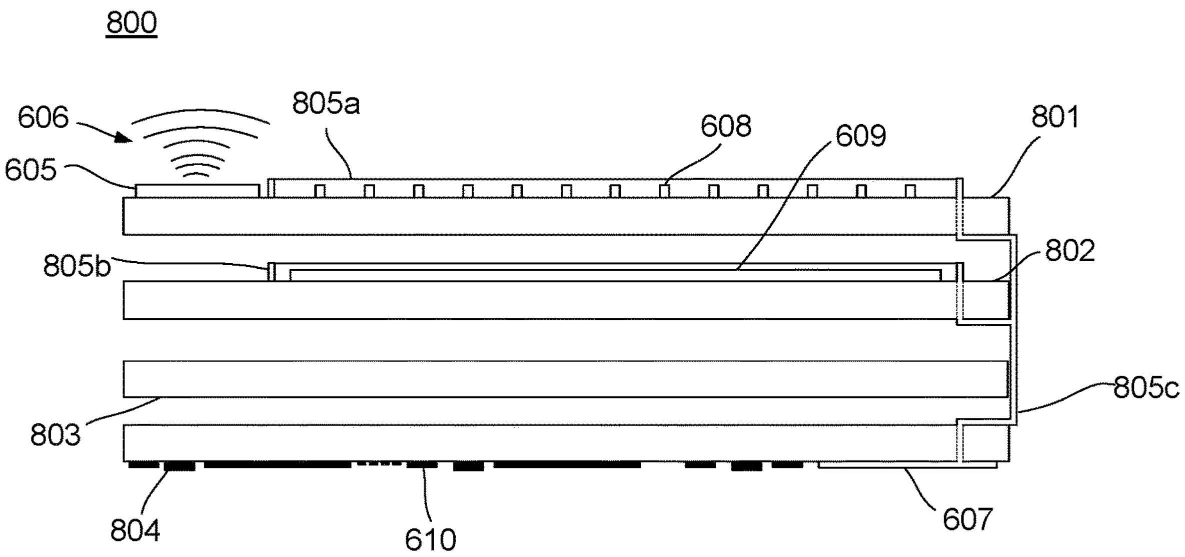
FIG. 8 depicts an example of a stack of layers in accordance with the present disclosure.

FIG. 8 depicts an example of a stack of layers 800 in accordance with the present disclosure. The stack of layers 800 includes a first sensor layer 801, a second sensor layer 802, a shield layer 803, and a component layer. While four layers are identified in the stack of layers 800, a stack of layers may have a different number of layers.

The first sensor layer contains the antenna 605 which broadcasts a wireless transmission 606. The first set 608 of electrodes is formed on the first sensor layer 801. Surrounding the first set 608 of electrodes, a first portion 805*a* of the shield feature is formed between the first set of electrodes and the antenna 605. The first portion 805*a* of the shield feature may help to isolate the antenna 605 from the first set 608 of electrodes and prevent the two from electrically interfering with each other. The first portion 805*a* of the shield feature is routed through the substrate of the first sensor layer 801 and connects to a third portion 805*c* of the shield feature.

The second sensor layer contains the second set 609 of electrodes. A second portion 805*b* of the shield feature surrounds the second set 609 of electrodes. The second portion 805*b* of the shield feature may help to isolate the antenna 605 from the second set 609 of electrodes and prevent the two from electrically interfering with each other. The second portion 805*b* of the shield feature is routed through the substrate of the second sensor layer 802 and connects to the third portion 805*c* of the shield feature.

While, in this example, the antenna 605 is located on the first sensor layer, in examples where a stack of layers includes more than one sensor layer, an antenna may be located on any of the sensor layers. For example, in examples where a stack of layers includes two sensor layers, an antenna may be formed on a first sensor layer or a second sensor layer. In examples, where a stack of layers includes three sensor layers, an antenna may be formed on a first sensor layer, a second sensor layer, or a third sensor layer, and so on.

While the stack of layers 800 includes only one antenna, a stack of layers may include a different number of antennas. For example, a stack may include two antennas, three antennas, or a different number of antennas. In examples where a stack includes more than one sensor layer, a first antenna may be formed on a first sensor layer while a second antenna may be formed on a second sensor layer, or a first and second antenna may be formed on a first sensor layer, etc.

The third portion 805*c* of the shield feature passes by the shield layer 803. The third portion 805*c* of the shield feature and the shield layer 803 are electrically independent from each other. The shield layer 804 may be made of a material constructed to block electrical interference, such as copper, aluminum, another appropriate shielding material, or a combination thereof. The shield layer 804 may be positioned adjacent to the sensor layers 801, 802 to shield the electrically sensitive elements on the sensor layers, such as the first set 608 of electrodes, the second set 609 of electrodes, or the antenna 605.

The third portion 805*c* of the shield feature is routed through the substrate of the component layer 804, where it connects to the grounding deposit 607. The grounding deposit 607 grounds the third portion 805*c* of the shield feature and consequently grounds the first and second portions 805*a*, 805*b* of the shield feature which are connected to the third portion.

Figure 9:
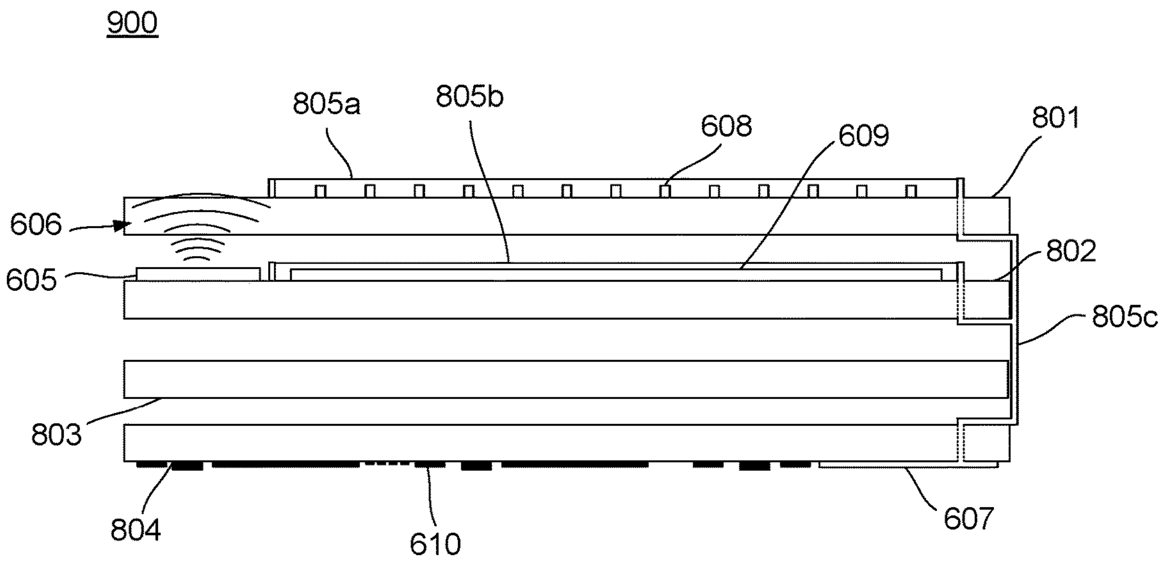
FIG. 9 depicts an example of a stack of layers in accordance with the present disclosure.

FIG. 9 depicts an example of a stack of layers 900 in accordance with the present disclosure. In this example, the antenna 605 is located on the second sensor layer 802.

Figure 10:
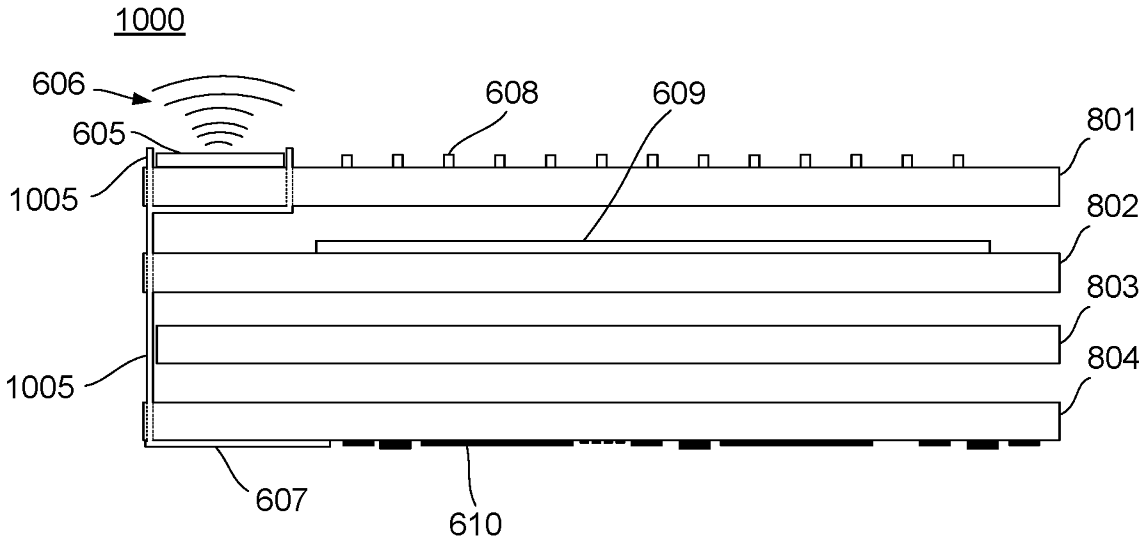
FIG. 10 depicts an example of a stack of layers in accordance with the present disclosure.

FIG. 10 depicts an example of a stack of layers 1000 in accordance with the present disclosure. In this example, a shield feature 1005 surrounds the antenna 605. In this example, the shield feature 1005 is a ground ring. The shield feature 1005 is routed through the first sensor layer 801 and the second sensor layer 802. The shield feature 1005 is electrically independent from the shield layer 803 and passes by it on one side. The shield feature 1005 routes through the component layer 804 where it is connected to the grounding deposit 607. The grounding deposit 607 grounds the shield feature 1005.

By surrounding the antenna 605 with the shield feature 1005, the shield feature may electrically insulate the antenna from the electrodes of the first set 608 and second set 609 of electrodes. Placing the shield feature 1005 between the antenna 605 and first set 608 and second set 609 of electrodes may prevent the elements from interfering with each other.

Figure 11:
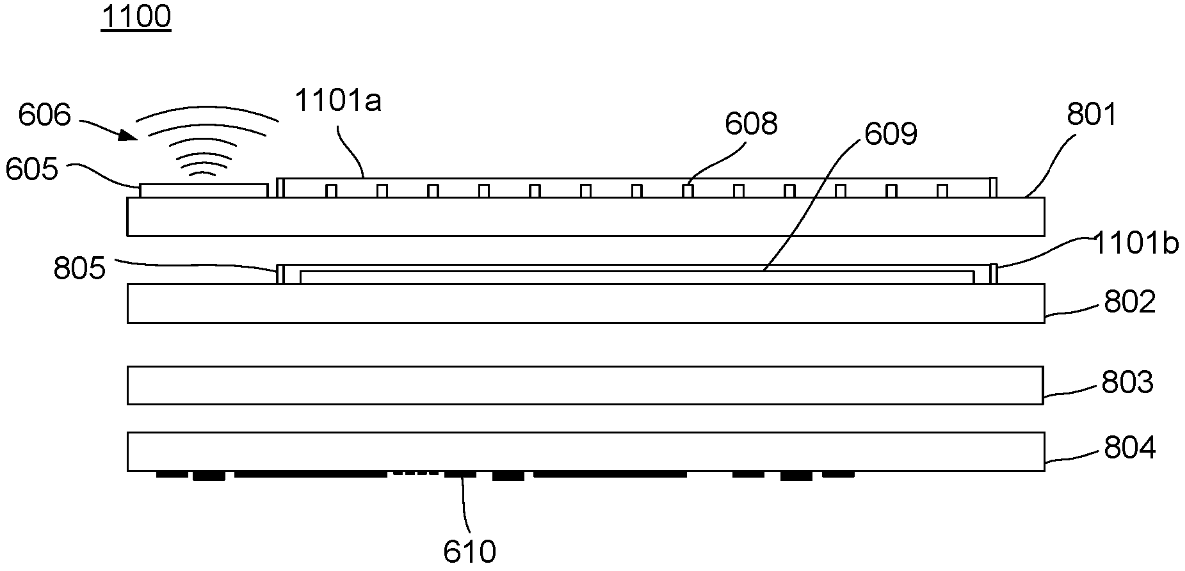
FIG. 11 depicts an example of a stack of layers in accordance with the present disclosure.

FIG. 11 depicts an example of a stack of layer 1100 in accordance with the present disclosure. In this example, a first portion 1101*a* of a shield feature surrounds the first set 608 of electrodes and a second portion 1101*b* of the shield feature surrounds the second set 609 of electrodes. In contrast to examples where a shield feature is continuous and grounded (see FIGS. 6-10), the shield feature in this example is discontinuous and ungrounded. The first portion 1101*a* of the shield feature is electrically independent from the second portion 1101*b* of the shield feature and both are ungrounded. Shield features that are ungrounded may be easier to form on a layer, while still shielding an antenna from a set of electrodes and vice versa. In some cases, an ungrounded and discontinuous shield feature may reduce the flow of electrons in the shield feature, which may reduce a temperature increase that may occur in some instances where the antenna induces an electrical current flow in the shield feature.

In some cases, the shield feature is discontinuous in the substrate surface. In some cases, segments of the shield feature are electrically connected to one another by joining the segments to each other by routing the shield element together on a different layer. In yet another example, the segments of the shield feature are electrically independent of each other. In still yet another example, the shield feature is continuous, but is ungrounded.

Figure 12A:
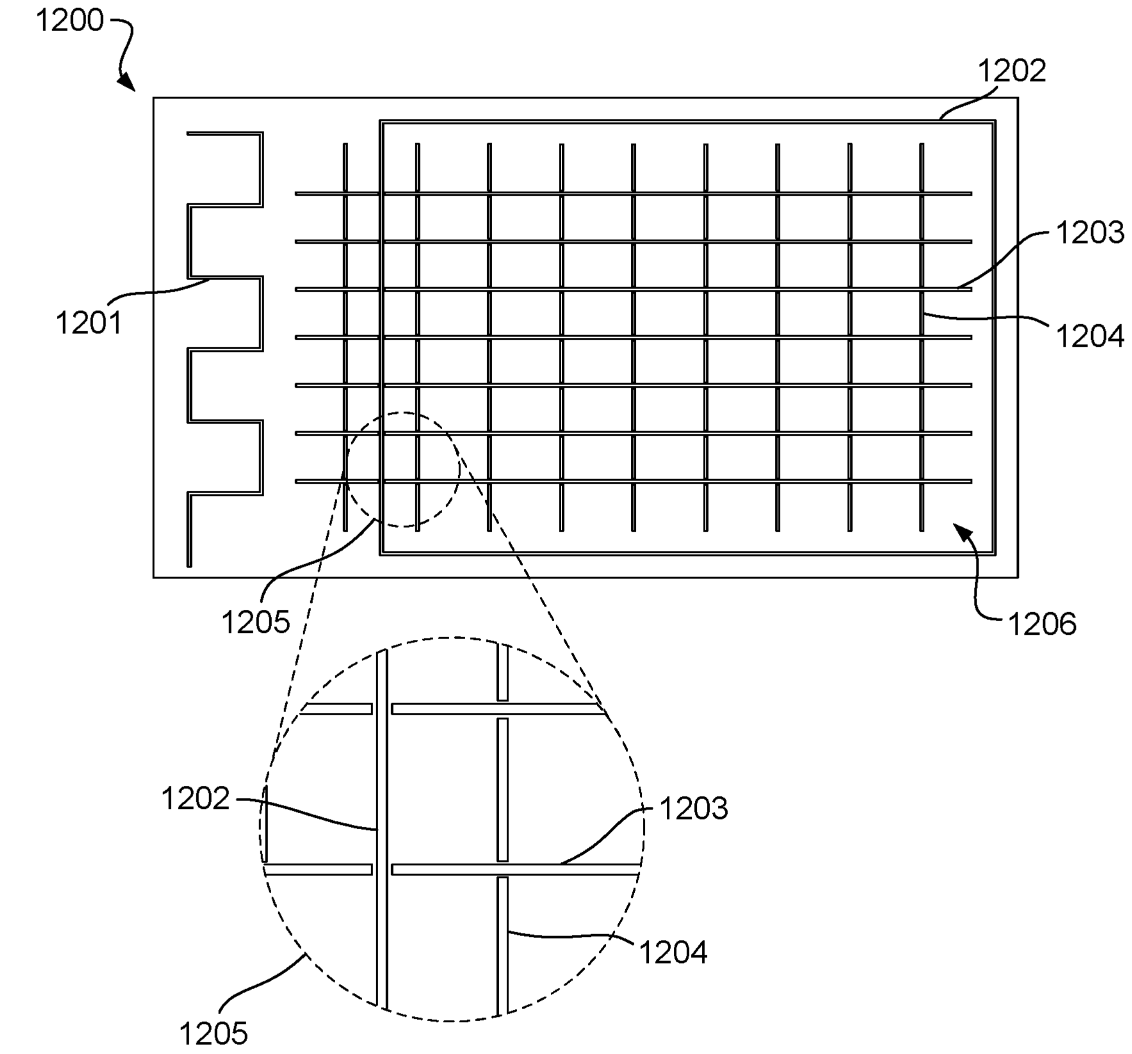
FIG. 12*a* depicts an example of a sensor layer in accordance with the present disclosure.

FIG. 12*a* depicts an example of a sensor layer 1200 in accordance with the present disclosure. In this example, the sensor layer 1200 includes an antenna 1201, a shield feature 1202, a first set 1203 of electrodes, and a second set 1204 of electrodes. For illustrative purposes, a close-up 1205 of the sensor layer 1200 depicts a portion of the layer in greater detail.

The sensor layer 1200 includes the antenna 1201. While one antenna is included in the sensor layer 1200, in other examples, a sensor layer may include more than one antenna. The antenna 1201 is placed on one side of the sensor layer 1201 and has a square wave shape. This shape may be used to transmit a wireless signal according to a Wi-Fi protocol or short-range wireless protocol.

The first set 1203 and second set 1204 of electrodes are placed on another side of the sensor layer 1200 apart from the antenna 1201. In this example, the electrodes from the first and second set 1203, 1204 of electrodes cross each other. The electrodes from the first set 1203 and second set 1204 of electrodes may be sense electrodes, transmit electrodes, or type of electrodes.

The first set 1203 and second set 1204 of electrodes form a mutual capacitance sensor 1206. While the electrodes in this example form a mutual capacitance sensor, in other examples, electrodes may form a different type of capacitive sensor, such as a self-capacitance sensor.

In this example, the electrodes from the first set 1203 and second set 1204 of electrodes are electrically independent from each other. By remaining electrically independent from each other, the first and second set 1203, 1204 of electrodes are prevented from shorting each other out. In locations where an electrode from the first set 1203 crosses an electrode from the second set 1204, the electrode from the second set may be routed through the substrate of the sensor layer 1200. In this way, the electrodes remain electrical independent from each other and do not touch.

The shield feature 1202 surrounds a portion of the mutual capacitance sensor 1206 on the sensor layer 1200. In this example, the shield feature 1202 is a ground ring. The shield feature 1202 may electrically isolate the mutual capacitance sensor 1206 from the antenna 1201. By placing the shield feature 1202 between at least part of the mutual capacitance sensor 1206 and the antenna 1201, interference to the capacitance sensor from the antenna may be reduced and vice versa.

Part of the mutual capacitance sensor 1206 is outside of the perimeter of the shield feature 1202, leaving a portion of the sensor exposed to the antenna 1201. By extending the mutual capacitance sensor 1206 beyond the limits of the shield feature 1202, the sensitive region of the capacitance module may be extended.

The shield feature 1202 is electrically independent from the electrodes of the first set 1203 and second set 1204 of electrodes which form the mutual capacitance sensor 1206. To preserve their electrical independence, wherever the shield feature 1202 and electrodes from the first or second set 1203, 1204 of electrodes would overlap, electrodes may be routed through the substrate of the sensor layer 1200 to prevent contact. In this example, the electrodes from the first set 1203 of electrodes are routed through the substrate of the sensor layer under the shield feature 1202.

For illustrative purposes, the close-up 1205 of the sensor layer 1200 illustrates both the electrical independence of the first set 1203 of electrodes from the second set 1204 of electrodes and the electrical independence of the first set of electrodes from the shield feature 1202. Electrodes from the second set 1204 of electrodes are routed through the substrate of the sensor layer 1200 underneath electrodes from the first set 1203 of electrodes. The electrodes from the first set 1203 do not physically touch electrodes from the second set 1204 of electrodes. Electrodes from the first set 1203 of electrodes are routed through the substrate of the sensor layer 1200 underneath the shield feature 1202. The electrodes from the first set 1203 of electrodes do not physically touch the shield feature 1202.

Figure 12B:
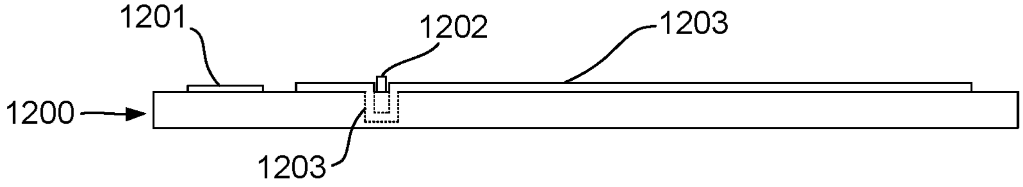
FIG. 12*b* depicts an example of a sensor layer in accordance with the present disclosure.

FIG. 12*b* depicts an example of the sensor layer 1200. For illustrative purposes, the sensor layer 1200 is depicted from the side in this example. FIG. 12*b* illustrates how the electrodes from the first set 1203 of electrodes are routed through the substrate of the sensor layer 1200 underneath the shield feature 1202 to avoid contact with the shield feature.

Figure 13:
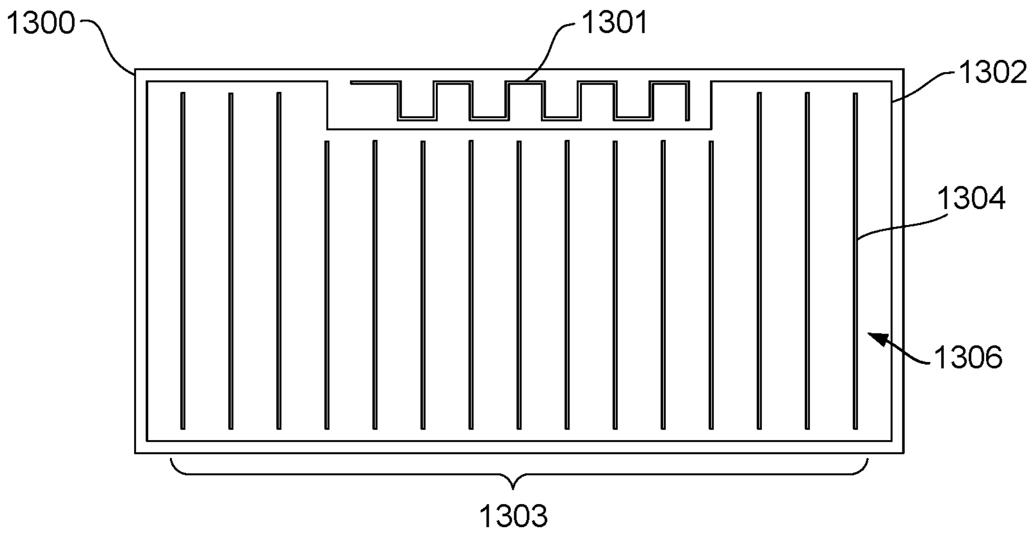
FIG. 13 depicts an example of a sensor layer in accordance with the present disclosure.

While previous examples depict shield features with a square shape (see FIGS. 5*a* & 12*a*), a shield feature may have a different shape. FIG. 13 depicts an example of a sensor layer 1300 in accordance with the present disclosure. The sensor layer 1300 includes an antenna 1301, a shield feature 1302, and a set 1304 of electrodes.

The antenna 1301 is formed on one portion of the sensor layer 1300. The antenna has a square wave shape, which may be used to transmit a wireless signal according to a Wi-Fi protocol or short-range wireless protocol. Although the sensor layer 1300 includes a single antenna 1301 in this example, in other examples, a sensor layer may include more than one antenna.

The set 1303 of electrodes 1304 are placed along the width of the sensor layer 1300. The electrodes 1304 may be sense electrodes, transmit electrodes, or another type of electrodes. The set 1303 of electrodes 1304 forms a self-capacitance sensor 1306.

The electrodes 1304 that form the self-capacitance sensor 1306 extend along each side of the antenna 1301. By extending along the sides of the antenna 1301, the electrodes 1304 occupy a greater portion of the sensor layer 1300 than they would otherwise, which may increase the size of the sensing region of the sensor layer.

The shield feature 1302 surrounds the self-capacitance sensor 1306. The shield feature 1302 is placed between the antenna 1301 and the electrodes 1304 that form the self-capacitance sensor 1306. By placing the shield feature 1302 in between the antenna 1301 and the self-capacitance sensor 1306, the antenna and the capacitance sensor may be electrically insulated from each other. The shield feature 1302 may prevent electrical interference to the self-capacitance sensor 1306 from the antenna 1301 and vice versa. The shield feature 1302 has an 8-sided shape to fully surround the self-capacitance sensor 1306.

Figure 14:
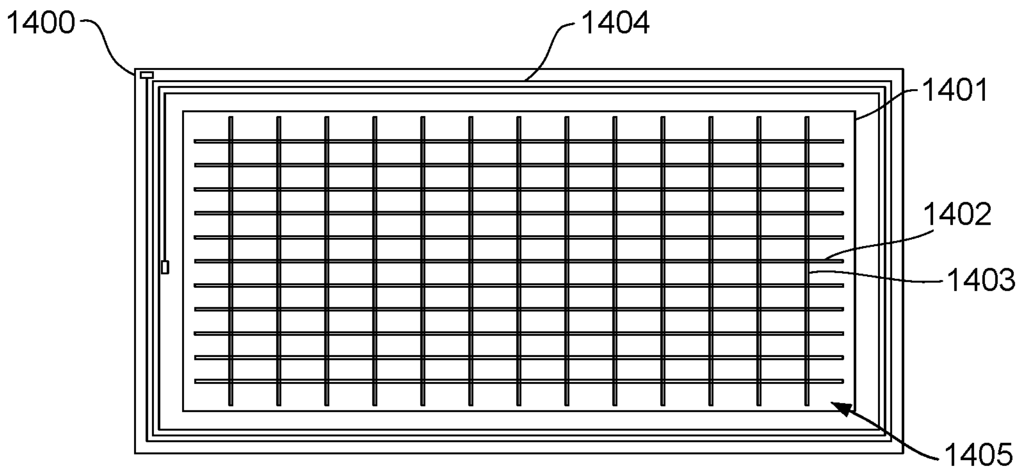
FIG. 14 depicts an example of a sensor layer in accordance with the present disclosure.

FIG. 14 depicts an example of a sensor layer 1400 in accordance with the present disclosure. The sensor layer 1400 includes an antenna 1404, a first set 1402 of electrodes, a second set 1403 of electrodes, and a shield feature 1401.

The antenna 1404 surrounds the shield feature 1401 along with the first and second set 1402, 1403 of electrodes. The antenna 1404 has a spiral shape that may be used to transmit a wireless signal according to an NFC protocol.

The first set 1402 of electrodes and the second set 1403 of electrodes may contain sense electrodes, transmit electrodes, another type of electrodes, or combinations thereof. In this example, the first set 1402 of electrodes and the second set 1403 of electrodes cross each other. The first set 1402 of electrodes and the second set 1403 of electrodes form a mutual capacitance sensor 1405. While this example depicts a sensor layer 1400 including a mutual capacitance sensor 1405, in other examples, a sensor layer may include a different type of sensor, such as a self-capacitance sensor.

In this example, the shield feature 1401 surrounds the mutual capacitance sensor 1405 and is surrounded by the antenna 1404. The shield feature 1401 is placed in between the mutual capacitance sensor 1405 and the antenna 1404. The shield feature 1401 may prevent electrical and/or magnetic interference between the antenna 1404 and the mutual capacitance sensor 1405.

In some examples, the shield feature may include a material that is electrically conductive and magnetically conductive. In other examples, the material may be electrically conductive, but magnetically insulating. In yet other examples, the material may be magnetically conductive and electrically insulating. One example of a magnetically conductive, but electrically insulating material is ferrite material. The shield feature may be made of a single material, multiple materials, layers of materials, or combinations thereof.

Figure 15A:
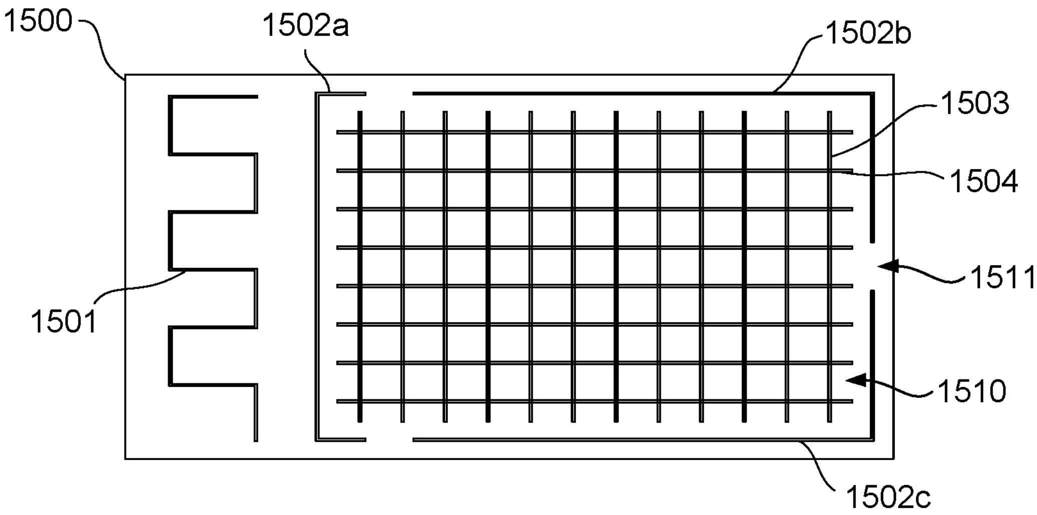
FIG. 15*a* depicts an example of a sensor layer in accordance with the present disclosure.

FIG. 15*a* depicts an example of a sensor layer 1500 in accordance with the present disclosure. The sensor layer 1500 includes an antenna 1501, a first portion 1502*a* of a shield feature, a second portion 1502*b* of the shield feature, a third portion 1502*c* of the shield feature, a first set 1503 of electrodes, and a second set 1504 of electrodes.

The antenna 1501 may be formed on one part of the sensor layer 1500. The antenna 1501 has a square wave shape, which may be used to transmit a wireless signal according to a Wi-Fi protocol or short-range wireless protocol. The antenna 1501 may be made of copper, gold, another appropriate antenna material, or combinations thereof. The antenna 1501 may be etched, printed, or otherwise formed on the sensor layer 1500. While the sensor layer 1500 includes one antenna 1501, in other examples, a sensor layer may include multiple antennas.

The first set 1503 of electrodes and the second set 1504 of electrodes may contain sense electrodes, transmit electrodes, another type of electrodes, or combinations thereof. In this example, the first set 1503 and second set 1504 of electrodes cross each other. The first set 1504 and second set 1504 of electrodes form a mutual capacitance sensor 1510. While the sensor layer in this example contains a mutual capacitance sensor 1510, in other examples, a sensor layer may contain a different type of sensor such as a self-capacitance sensor.

The electrodes from the first set 1503 of electrodes and the second set 1504 of electrodes are electrically independent from each other. Where an electrode from the first set 1504 crosses an electrode from the second set 1504, the electrode from the second set may be routed through the substrate of the sensor layer 1500. By routing one electrode through the sensor layer 1500, the two electrodes remain electrically independent from each other and do not touch.

The mutual capacitance sensor 1510 may be surrounded by a shield feature that includes a first portion 1502*a*, second portion 1502*b*, and third portion 1502*c*. The first portion 1502 of the shield feature is located between the mutual capacitance sensor 1510 and the antenna 1501 and may prevent electrical interference between the antenna and the sensor. The second portion 1502*b* is located along one side of the mutual capacitance sensor. The third portion 1502*c* is located along another side of the mutual capacitance sensor.

In examples where a shield feature includes multiple portions, the portions may be connected to each other through vias in the substrate or some other method, or the portions may be electrically independent from each other. It is also possible for some portions of a shield feature to be connected, while other portions of the same shield feature are electrically independent. In examples where a shield feature includes multiple portions, some portions may be grounded, while other portions may be electrically independent. In this example, the first portion 1502, the second portion 1502*b*, and the third portion 1502*c* of the shield feature are all electrically independent from each other.

Separating a shield feature into multiple portions may present a few advantages, including, but not limited to, reducing material cost, reinforcing certain portions of a sensor layer which may need additional shielding between elements, and reducing the footprint of a shield feature on a sensor layer, which may help to reduce size. Gaps between portions of a shield feature might be located in positions where shielding is not necessary, so that interference caused by a gap of shielding material may be minimized. Such gaps may be located where they are not in between two electrical elements. For example, a gap 1511 between the second portion 1502*b* and the third portion 1502*c* of the shield feature is placed so it is only adjacent to the mutual capacitance sensor 1510. In other examples, the gap may be located in other regions of the shield feature.

Figure 15B:
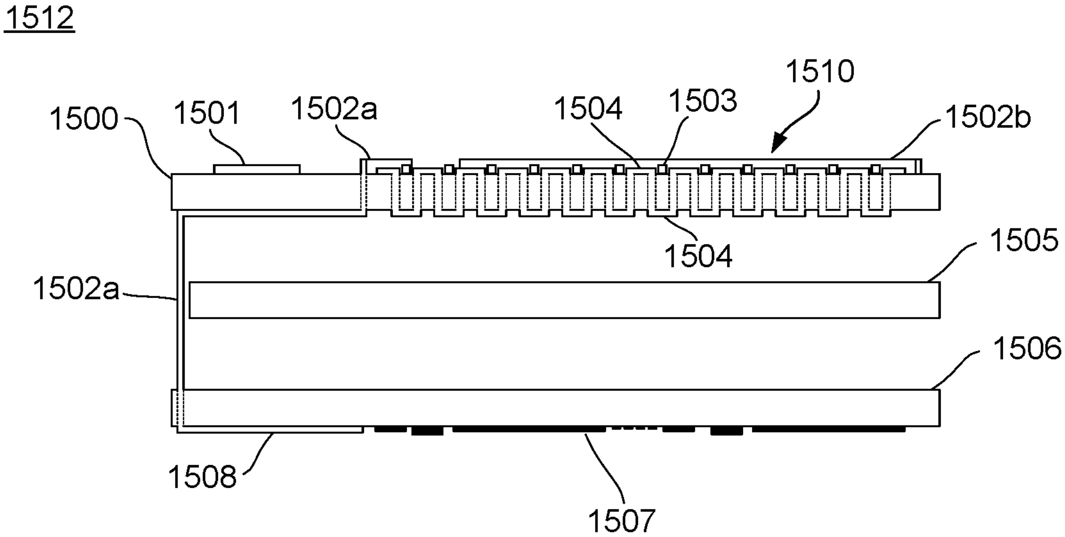
FIG. 15*b* depicts an example of a stack of layers in accordance with the present disclosure.

FIG. 15*b* depicts an example of a stack of layers 1512 in accordance with the present disclosure. The stack of layers 1512 includes the sensor layer 1500 described in FIG. 15*a*, a shield layer 1505, and a component layer 1506. For illustrative purposes, the layers of the stack of layers 1512 are shown from a side view.

The first portion 1502*a* of the shield feature is routed through the substrate of the sensor layer 1500. The first portion 1502*a* of the shield feature passes by the shield layer 1505 and is routed through the component layer 1506 where it is connected to a grounding deposit 1508. The grounding deposit 1508 may be made of copper, gold, another appropriate grounding material, or a combination thereof. The grounding deposit 1508 grounds the first portion 1502*a* of the shield feature.

The second portion 1502*b* and the third portion 1502*c* (portion 1502*c* is not pictured in FIG. 15*b*) of the shield feature are not grounded to the grounding feature 1508, whereas the first portion 1502*a* of the shield feature is grounded to the grounding feature. Grounding the second portion 1502*b* and third portion 1502*c* of the shield feature may not be necessary for the second or third portion to shield the capacitance sensor 1510. By keeping the second portion 1502*b* and third portion 1502*c* of the shield feature electrically independent from both the first portion 1502*a* of the shield feature and the grounding deposit 1508, the materials that would otherwise ground them may be saved, reducing the cost, complexity, and size of the apparatus.

Where an electrode from the first set 1503 crosses an electrode from the second set 1504, the electrode from the second set may be routed through the substrate of the sensor layer 1500. In this way, the first set 1503 of electrodes is electrically independent from the second set 1504.

The shield layer 1505 may be made of copper, steel, or another appropriate shielding material that may be etched, printed, or otherwise formed on a substrate. The shield layer 1505 may prevent electrical and/or magnetic interference from interfering with the sensitive electrical elements on the sensor layer 1500, such as the antenna 1501 or the mutual capacitance sensor 1510.

The shield layer 1505 is electrically independent from the first portion 1502*a* of the shield feature. As the shield feature shields electrical signals on the sensor layer, the shield feature may pick up electrical signals. By keeping the shield layer 1505 electrically independent from the shield feature, the shield layer may be prevented from conducting and propagating any electrical signals that the shield feature may pick up.

The component layer 1506 includes components 1507 and the grounding deposit 1508. The components 1507 may be used to operate the capacitance module. Components may include but are not limited to a central processing unit (CPU), a digital signal processor (DSP), an analog front end (AFE), an amplifier, a peripheral interface controller (PIC), another type of microprocessor, an integrated circuit, a field programmable gate array (FPGA), an application specific integrated circuit (ASIC), a combination of logic gate circuitry, other types of digital or analog electrical components, or combinations thereof.

Figure 16A:
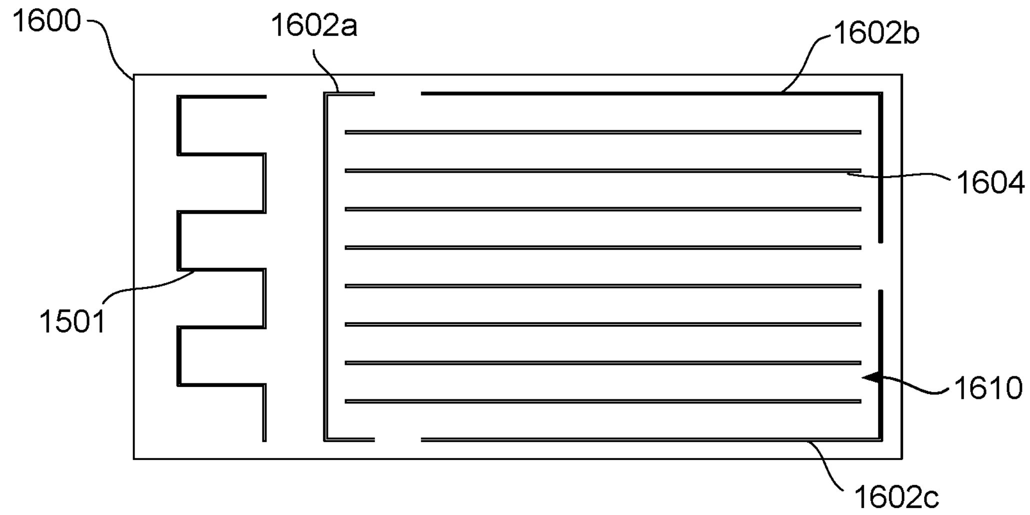
FIG. 16*a* depicts an example of a sensor layer in accordance with the present disclosure.

FIG. 16*a* depicts an example of a sensor layer 1600 in accordance with the present disclosure. The sensor layer 1600 includes the antenna 1501, a first portion 1602*a* of a shield feature, a second portion 1602*b* of the shield feature, a third portion 1602*c* of the shield feature, and a set 1604 of electrodes.

The set 1604 of electrodes may include sense electrodes, transmit electrodes, or another type of electrodes. The set 1604 of electrodes forms a self-capacitance sensor 1610.

The first portion 1602*a* of the shield feature is located in between the antenna 1501 and the self-capacitance sensor 1610. The first portion 1602*a* of the shield feature may prevent electrical interference to the self-capacitance sensor 1610 from the antenna 1501 and vice versa. The second portion 1602*b* and the third portion 1602*c* of the shield feature surround the self-capacitance sensor 1610 together with the first portion 1602*a* of the shield feature.

Figure 16B:
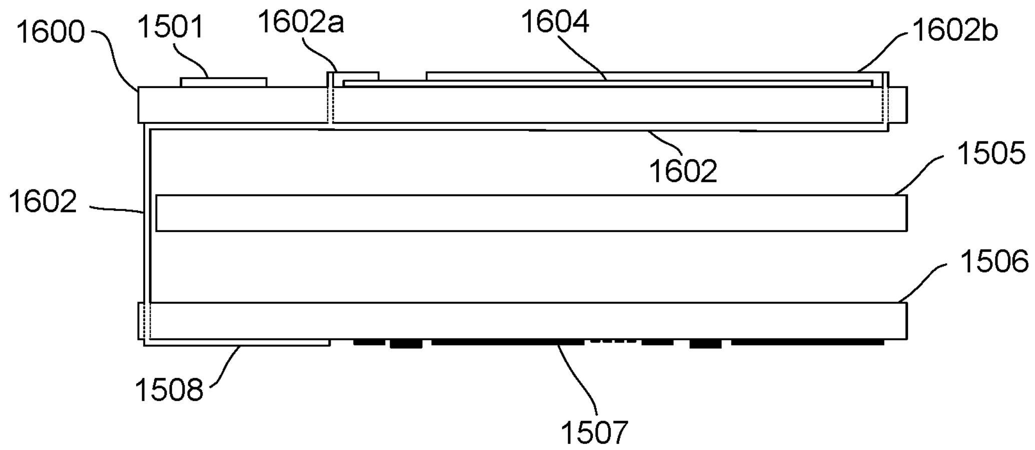
FIG. 16*b* depicts an example of a stack of layers in accordance with the present disclosure.

FIG. 16*b* depicts an example of a stack of layers 1612 in accordance with the disclosure. The stack of layers 1612 in this example may include the sensor layer 1600 described in FIG. 16*a*, the shield layer 1505 described in FIG. 15*b*, and the component layer 1506 described in FIG. 15*b*.

In this example, the first portion 1602*a*, second portion 1602*b*, and third portion 1602*c* of the shield feature are each routed through the substrate of the sensor layer 1600 and connected to each other. The shield feature 1602 is routed past the shield layer 1505 and through the substrate of the component layer 1506, where it is connected to the grounding deposit 1508. The grounding deposit 1508 may provide a connection to ground.

Figure 17A:
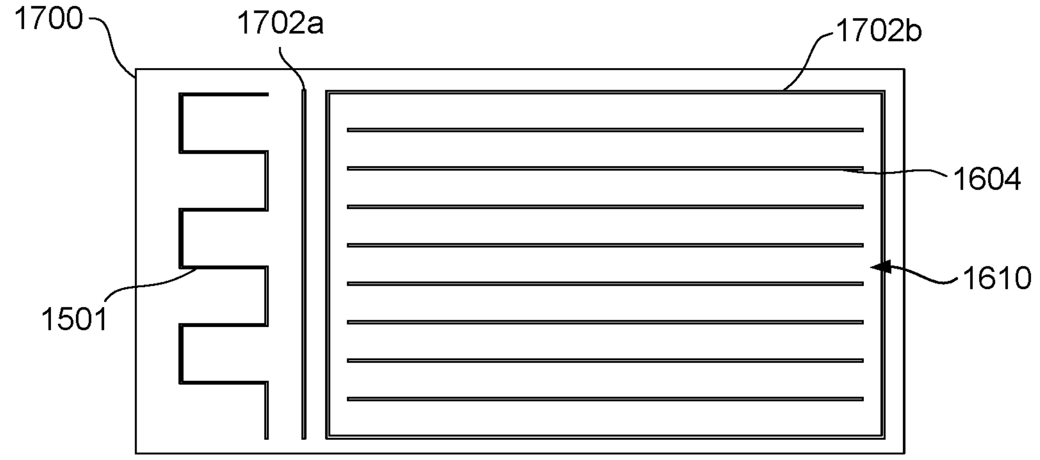
FIG. 17*a* depicts an example of a sensor layer in accordance with the present disclosure.

FIG. 17*a* depicts an example of a sensor layer 1700 in accordance with the present disclosure. The sensor layer 1700 includes the antenna 1501, the self-capacitance sensor 1610, a first portion 1702*a* of a shield feature, and a second portion 1702*b* of the shield feature.

In some embodiments, additional portions of a shield feature may be included between two elements, such as an antenna and a capacitive sensor. By placing an additional portion between two elements, the shield feature may more effectively prevent interreference between the two elements. In this example, a first portion 1702*a* of the shield feature and a second portion 1702*b* are formed on the sensor layer 1700 to prevent electrical interference between the antenna 1501 and the self-capacitance sensor 1610.

The first portion 1702*a* of the shield feature is located between the antenna 1501 and one side of the second portion 1702*b* of the shield feature. The first portion 1702*a* provides additional shielding between the antenna 1501 and the self-capacitance sensor 1610 and may help prevent electrical interference between the two elements.

The second portion 1702*b* of the shield feature is a ground ring which surrounds the self-capacitance sensor. The second portion 1702*b* of the shield feature prevents electrical interference to the self-capacitance sensor 1610 from the antenna 1501 and vice versa.

Figure 17B:
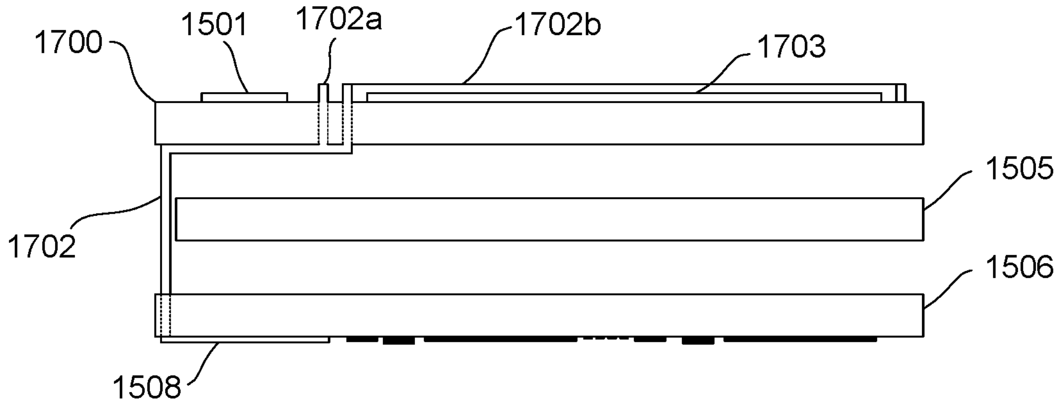
FIG. 17*b* depicts an example of a stack of layers in accordance with the present disclosure.

FIG. 17*b* depicts an example of a stack of layers 1712 in accordance with the present disclosure. The stack of layer 1712 may include the sensor layer 1700 described in FIG. 17*a*, the shield layer 1505, and the component layer 1506.

The first portion 1702*a* of the shield feature and the second portion 1702*b* of the shield feature on the sensor layer are routed through the substrate of the sensor layer 1700 and connected to each other. The shield feature 1702 passes by the shield layer 1505 and is routed through the substrate of the component layer 1506, where it is connected to the grounding deposit 1508.

Figure 18:
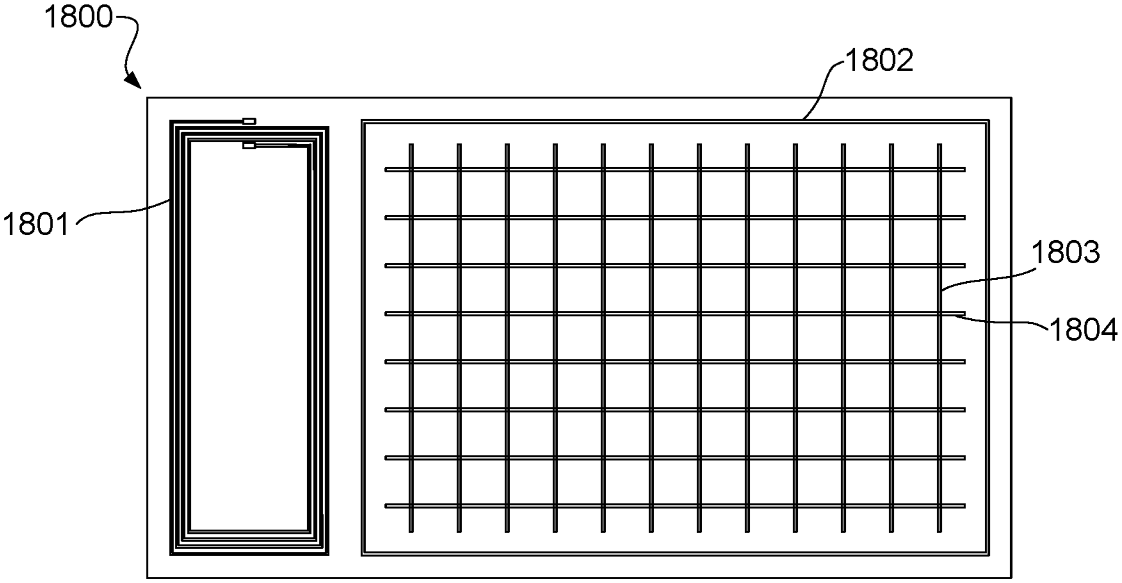
FIG. 18 depicts an example of a sensor layer in accordance with the present disclosure.

FIG. 18 depicts an example of a sensor layer 1800 in accordance with the present disclosure. The sensor layer 1800 includes an antenna 1801, a shield feature 1802, a first set 1803 of electrodes, and a second set 1804 of electrodes.

The antenna 1801 is located on one part of the sensor layer 1800 and has a spiral shape. This shape of antenna may be used to transmit a wireless signal according to an NFC protocol. The antenna 1801 may be made of copper, gold, another appropriate material, or a combination thereof. The antenna 1801 may be printed, etched, or otherwise formed on the sensor layer. While in this example the sensor layer 1800 contains just one antenna 1801, in other examples, a sensor layer 1800 may contain more than one antenna.

The first set 1803 of electrodes and the second set 1804 of electrodes may be transmit electrodes, sense electrodes, another type of electrodes, or combinations thereof. The first set 1803 and second set 1804 of electrodes form a mutual capacitance sensor. The first and second sets 1803, 1804 of electrodes are electrically independent from each other. Where an electrode from the first set 1803 of electrodes crosses an electrode from the second set 1804 of electrodes, an electrode from either the first set of electrodes or second set of electrodes may be routed through the substrate of the sensor layer 1800 underneath the other electrode, preserving the electrical independence of the two sets of electrodes.

The shield feature 1802 surrounds the mutual capacitance sensor formed by the first set 1803 and second set 1804 of electrodes. In this example, the shield feature is a ground ring. The shield feature 1802 is located in between the mutual capacitance sensor and the antenna 1801. The shield feature 1802 may prevent electrical interference to the mutual capacitance sensor from the antenna 1801 and vice versa.

Figure 19:
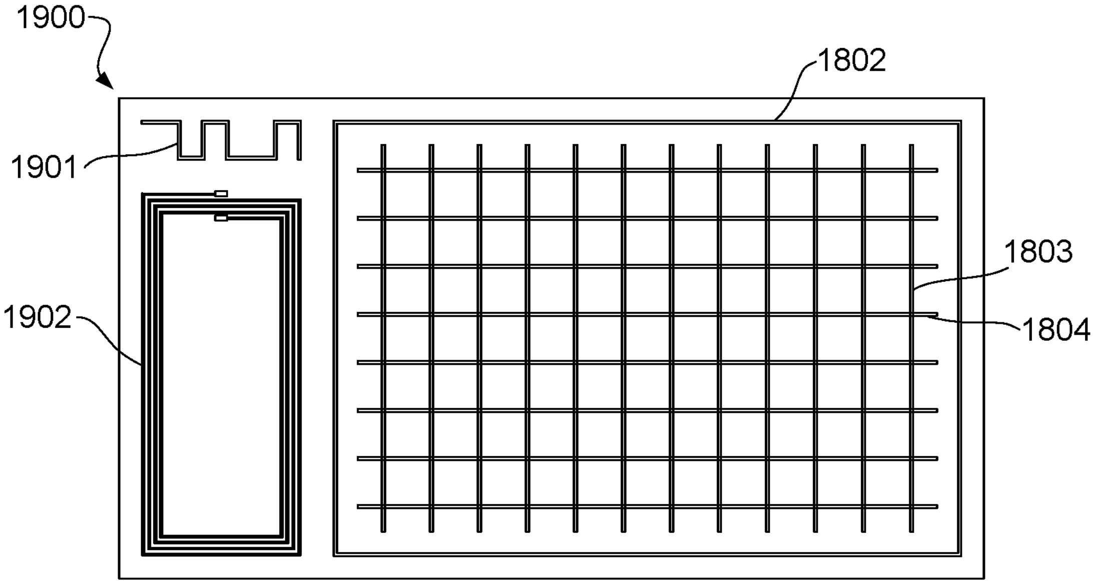
FIG. 19 depicts an example of a sensor layer in accordance with the present disclosure.

FIG. 19 depicts an example of a sensor layer 1900 in accordance with the present disclosure. The sensor layer 1900 includes a first antenna 1901, a second antenna 1902, the shield feature 1802, the first set 1803 of electrodes, and the second set 1804 of electrodes.

The first antenna 1901 and second antenna 1902 are formed on one part of the sensor layer 1900. The first antenna 1901 has a square wave shape that may be used to transmit a wireless signal according to a Wi-Fi protocol or short-range wireless protocol. The second antenna 1902 has a spiral shape that may be used to transmit a wireless signal according to an NFC protocol.

Figure 20:
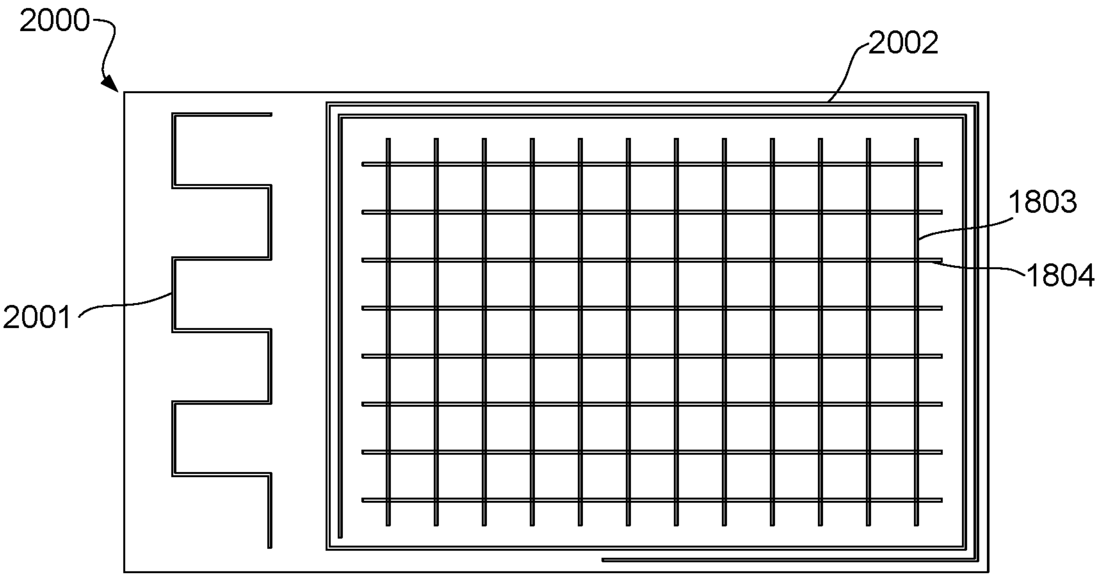
FIG. 20 depicts an example of a sensor layer in accordance with the present disclosure.

FIG. 20 depicts an example of a sensor layer 2000 in accordance with the present disclosure. The sensor layer 2000 includes an antenna 2001, the first set 1803 of electrodes, the second set 1804 of electrodes, and a shield feature 2002.

The antenna 2001 is located on one part of the sensor layer 2000 and has a spiral shape. This shape of antenna may be used to transmit a wireless signal according to an NFC protocol. The antenna 2001 may be made of copper, gold, another appropriate material, or a combination thereof. The antenna 2001 may be printed, etched, or otherwise formed on the sensor layer.

The shield feature 2002 surrounds the mutual capacitance sensor that is formed by the first set 1803 of electrodes and the second set 1804 of electrodes. The shield feature 2002 has a spiral shape. In some circumstances, the shape of the shield feature 2002 may help to prevent electrical interference to the mutual capacitance sensor from the antenna 2001 than a square shaped shield feature because the spiral shape of this shield feature has multiple sides that are located in between the antenna 2001 and the mutual capacitance sensor.

Figure 21:
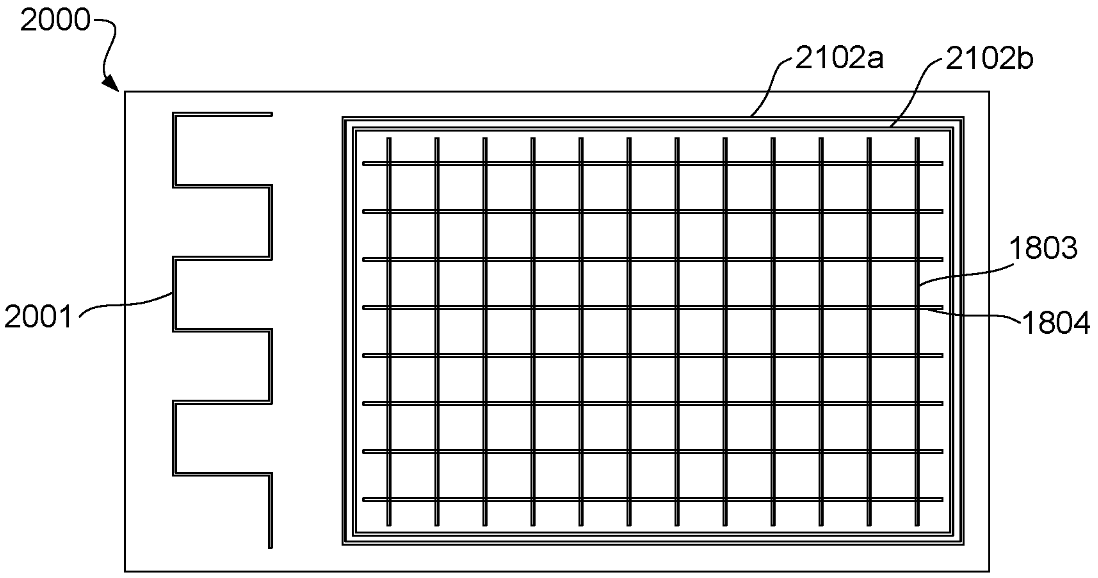
FIG. 21 depicts an example of a sensor layer in accordance with the present disclosure.

FIG. 21 depicts an example of a sensor layer 2100 in accordance with the present disclosure. The sensor layer 2100 includes the antenna 2001, the first set 1803 of electrodes, the second set 1804 of electrodes, a first portion 2102*a* of a shield feature, and a second portion 2102*b* of the shield feature.

The first portion 2102*a* of the shield feature and the second portion 2102*b* of the shield feature form concentric rectangles which surround the mutual capacitance sensor formed by the first set 1803 and second set 1804 of electrodes. The first and second portion 2102*a*, 2102*b* are located in between the antenna 2001 and the mutual capacitance sensor, and may prevent the two elements from electrically interfering with each other.

In some circumstances, by having two rectangular portions, the shield feature formed by the first portion 2102*a* and the second portion 2102*b* may more effectively prevent electrical interference between the antenna 2001 and the mutual capacitance sensor than a shield feature that only included a single rectangular portion. The first portion 2102*a* and the second portion 2102*b* of the shield feature may be connected or electrically independent from each other. The first portion 2102*a* and the second portion 2102*b* of the shield feature may each be grounded or ungrounded.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. An apparatus, comprising:

a stack of layers;

a capacitive sensor layer in the stack of layers;

a set of electrodes on the capacitive layer;

an antenna on the capacitive layer; and a shield feature between at least a portion of the set of electrodes and the antenna;

wherein the shield feature surrounds a portion of the set of electrodes.

2. The apparatus of claim 1, wherein the shield feature includes a ground ring.

3. The apparatus of claim 1, wherein the shield feature includes multiple sections.

4. The apparatus of claim 3, wherein the multiple sections are electrically independent.

5. The apparatus of claim 3, wherein the multiple sections are electrically connected.

6. The apparatus of claim 1, wherein the antenna surrounds the set of electrodes on the capacitive layer.

7. The apparatus of claim 1, wherein a portion of the shield feature is ungrounded.

8. The apparatus of claim 1, wherein a portion of the shield feature is grounded.

9. The apparatus of claim 1, wherein the shield feature does not overlap a portion of the set of electrodes.

10. The apparatus of claim 1, wherein the shield feature surrounds the set of electrodes.

11. The apparatus of claim 1, wherein the shield feature surrounds the antenna.

12. The apparatus of claim 1, wherein the shield feature includes at least a section that is electrically conductive.

13. The apparatus of claim 1, wherein the shield feature includes at least a section that is magnetically conductive.

14. The apparatus of claim 1, wherein the shield feature includes at least a section that is magnetically conductive and electrically insulating.

15. The apparatus of claim 1, wherein the shield feature includes a ferrite material.

16. The apparatus of claim 1, wherein the stack of layers includes a first capacitive sensor layer and a second capacitive sensor layer, and the antenna is formed on at least one of the capacitive sensor layers.

17. The apparatus of claim 16, wherein the shield feature is formed on both the first capacitive sensor layer and the second capacitive sensor layer.

18. An apparatus, comprising:

a substrate including a set of capacitance sensing electrodes;

an antenna on the substrate; and a shield feature on the substrate between the set of electrodes and the antenna;

wherein the shield feature surrounds the set of capacitance sensing electrodes.

* * * * *